April 9, 1957

T. C. HEATH 2,788,412

TEMPERATURE CORRECTED ELECTRICAL CONTROL DEVICE

Filed July 17, 1953

INVENTOR.
Thomas C. Heath
BY
His Attorney

April 9, 1957  T. C. HEATH  2,788,412
TEMPERATURE CORRECTED ELECTRICAL CONTROL DEVICE
Filed July 17, 1953  2 Sheets-Sheet 2

INVENTOR.
Thomas C. Heath
BY
His Attorney

United States Patent Office 2,788,412
Patented Apr. 9, 1957

2,788,412

TEMPERATURE CORRECTED ELECTRICAL CONTROL DEVICE

Thomas C. Heath, Anderson, Ind., assignor to General Motors Corporation, Detroit, Mich., a corporation of Delaware Application July 17, 1953, Serial No. 368,561

12 Claims. (Cl. 200—87)

This invention relates to electrical controls and is particularly concerned with regulators used in connection with battery charging circuits.

Regulators of various types are normally included in automotive battery charging circuits. These regulators are of the magnetic type and are used to regulate the charging input to the battery. This is done in two ways: First, by opening the charging circuit and, second, by inserting resistance in said circuit so that overcharging of the battery is prevented while simultaneously permitting sufficient charging thereof to prevent battery rundown.

This invention is directed to a regulator which includes an armature assembly controlled by a magnet, which armature opens and closes contacts in the charging circuit; a thermo-responsive member is utilized to vary the action of the armature in accordance with variations in ambient temperature. The compensator is mounted on the armature assembly and reacts against the spring, which normally holds the armature in contact closing position whereby the tension of the spring is varied in response to temperature conditions.

An object of the invention is to vary the voltage regulation of the control device in response to temperature conditions whereby more accurate voltage control is accomplished.

Further objects and advantages of the present invention will be apparent from the following description reference being had to the accompanying drawings wherein a preferred embodiment of the present invention is clearly shown.

Figure 6:
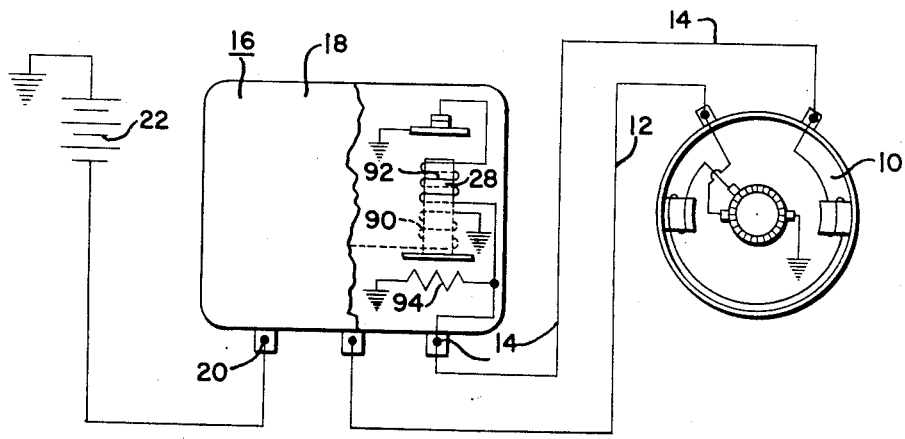
Fig. 6 is a schematic circuit diagram showing the incorporation of the regulator in an automobile electric system.

With specific reference to the drawings, 10 indicates a generator (see Fig. 6) having an armature wire 12 and a field lead 14 connected to a regulator 16 enclosed in a box 18. Regulator 16 is connected by wire 20 to a battery 22.

Figure 1:
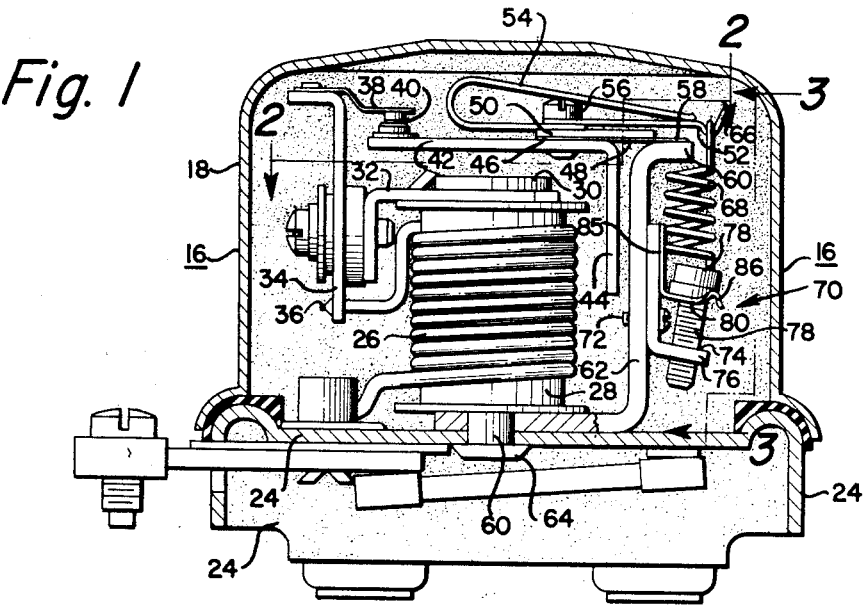
Fig. 1 is an elevational view showing the improved voltage regulator.
Figure 2:
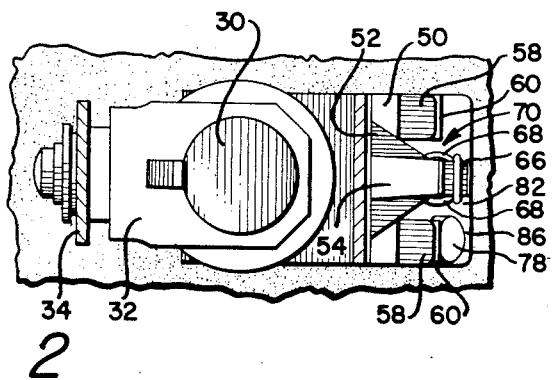
Fig. 2 is a top plan view of a magnet assembly substantially as indicated by the lines and arrow 2—2 of Fig. 1.
Figure 4:
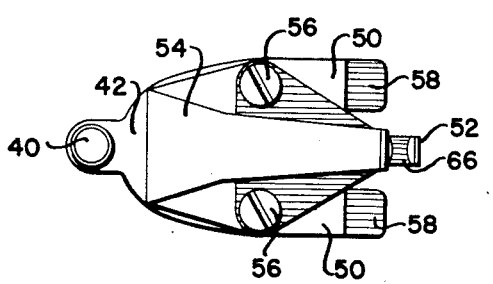
Fig. 4 is a top plan view of the armature assembly.
Figure 3:
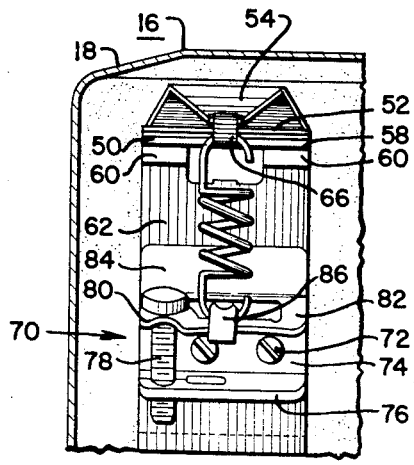
Fig. 3 is an end elevation of the magnet assembly and spring support substantially as indicated by the line and arrows 3—3 of Fig. 1.

Referring to Fig. 1, the regulator 16 comprises a base 24 which carries a magnet assembly that includes a core 28 having a pole piece 30, and a bracket 32 supporting a connector 34 to which one end of the winding 26 is fixed at 36. The connector 34 supports a fixed contact 38 which cooperates with a movable contact 40 carried by an armature plate 42. The plate 42 is part of an armature assembly shown in Figs. 4 and 5 and has a dependent portion 44 extending at right angles from an anchorage portion 46, which supports spring hinge 48, a spacer 50, a bimetal spring hanger 52, and a bimetal compensator 54. All of these members are secured together by screws 56. The spring hinge 48 extends outwardly from mounting screw 56 and terminates in two spaced tongues 58 58, Fig. 4, that are secured by rivets or by welding to spaced lugs 60 of a magnet frame member 62 disposed adjacent to the magnet assembly 28. The magnet frame member 62 is secured to the base 24 by an extension 64 of the core 30 which passes through the base 24 and is riveted thereto.

The spring hanger 52 ends in a hook or spring seat 66 supporting one end of a spring 68, the other end of which is secured to an adjustable anchorage 70 mounted on the frame member 62, by means of screws or rivets 72. This spring anchorage comprises a bracket 74 with a flange 76 extending transverse of member 62 to receive an adjusting screw 78 passing through an oblong hole in a bendable tongue 80 integrally joined at 82 to a flange portion 84 generally parallel with a part 85 and carried by the bracket 74. Along the outer edge of the spring tongue 80, and intermediate its length, there is provided a hook portion 86 to which the other end of the spring 68 is anchored. When assembled as explained, the spring 68 urges the armature assembly in a clockwise direction upon the hinge portion 48 to maintain the contacts 38, 40 in closed position with a predetermined spring force. The spring force by which the contacts are kept closed can be varied by adjustment of spring 70 and thus determines the magnetic force that must be developed in the magnet assembly for opening the contacts.

During operation as a voltage controller, the voltage regulator limits the voltage in a charging circuit to a safe value, thereby controlling the charging rate of the generator in accordance with the requirements of the battery and the current consuming electrical units in operation. When the battery is low the generator output is near maximum, but as the battery comes up to charge and other requirements are small, the voltage regulator operates to limit the voltage thereby reducing the generator output. This protects the battery from overcharge and the electrical system from high voltage.

The voltage regulator consists of two windings 90 and 92 assembled on the same core, an armature, a set of fixed contact points and a fixed resistance. The voltage or shunt winding 90 consists of a plurality of turns of fine wire connected so that generator voltage is impressed upon it at all times. The series winding 92 is of fewer turns of heavier wire and carries the generator field current directly to ground when the regulator contact points 38, 40 are closed. The adjustable spring anchorage 70 for the spiral spring makes it possible for initial adjustment of the voltage regulator setting. An adjustment that increases the spring tension increases the voltage setting, while reduction of the spring tension lowers the voltage setting.

When the generator voltage reaches the value for which the voltage regulator is set the combined magnetic pull of the shunt and series windings 90 and 92 is sufficient to overcome the armature spring tension so that the armature is pulled toward the core and the contact points are separated. The instant the points separate, Fig. 6, the field current flows to ground through the resistance 94. This reduces the current flow through the field coils and decreases the generator voltage and output.

As soon as the field current stops flowing through the series winding 92 the magnetic pull of this winding collapses. In addition the reduced voltage of the circuit causes a weakening of the magnetic field of the voltage winding 90 in the regulator. The resulting loss of magnetism permits the spring 68 to pull the armature away from the core and close the contact points again, thereby directly grounding the generator field so that the generator voltage and output increases.

This cycle is repeated 150 to 250 times a second causing a vibrating action of the armature which holds the voltage to constant value. By maintaining a constant voltage, the voltage regulator continues to reduce the generator output as the battery comes up to charge. When the battery reaches a fully charged condition the voltage regulator will have reduced the generator output to a relatively few amperes.

The voltage regulator has a bimetal spring support 52 and a bimetal compensator 54 for thermostatic or temperature control. This automatically permits regulation to a higher voltage when the unit is cold and a lower voltage, when hot, a desirable condition which promotes proper charging of the battery.

Figure 5:
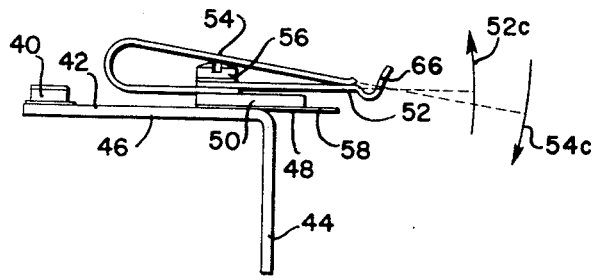
Fig. 5 is a side elevation of the armature assembly.

In the operation of the voltage temperature compensation feature, the end of a spring hanger 52 deflects upwardly with a decrease in temperature arrow 52c, Fig. 5, while the free end of the compensator 54 deflects downwardly with a decrease in temperature arrow 54c. When the regulator is hot for example, at 140° F. there is clearance between the end of the spring hanger 52 and the end of the compensator 54. As the temperature decreases, the outer end of the spring hanger deflects upwardly thereby increasing the tension of the spiral spring causing the operating voltage to increase, the compensator deflects downwardly but does not contact the spring hanger until the temperature has decreased to 50° F. or some other predetermined temperature. With further decrease in temperature the operating voltage remains practically constant due to the bucking action between the two bimetal parts. This method of temperature-voltage compensation maintains the voltage at values more nearly that which the battery requires than has heretofore been possible.

While the embodiment of the present invention as herein disclosed, constitutes a preferred form, it is to be understood that other forms might be adopted.

What is claimed is as follows:

1. In a regulator of the character described, the combination comprising; a magnet assembly having a core, energizable windings and a fixed contact electrically connected with said windings, a magnet frame member extending along the magnet assembly, an armature assembly hingedly connected to the frame member and extending over the magnet assembly and having a movable contact cooperable with the fixed contact, spring means under tension for normally urging said armature assembly into contact closing position against the force of said magnet, and a temperature compensating means carried by said armature assembly and operable upon said spring means to vary the regulator setting in response to temperature changes, said temperature compensating means being constructed and arranged to decrease said spring means tension when the temperature increases above a predetermined temperature and responsive to temperature changes below said predetermined temperature to maintain the said spring means tension substantially constant below said predetermined temperature.

2. In a regulator of the character described, the combination comprising; a magnet assembly having a core, energizable windings and a fixed contact electrically connected with said windings, a magnet frame member extending along the magnet assembly, an armature assembly hingedly connected to the frame member and extending over the magnet assembly and carrying a movable contact cooperable with the fixed contact, spring means normally urging said armature assembly into contact closed position against the force of said magnet, means connecting one end of said spring with the frame member and adjustable for varying the regulator setting at which the contacts will open, and temperature responsive means carried by said armature and providing an anchor for the other end of said spring, said temperature responsive means also comprising means responsive to temperature changes below a predetermined temperature for modifying the effect of said anchor to provide substantially constant spring tension below said predetermined temperature.

3. In a regulator of the character described, the combination comprising; a magnet assembly having a core, energizable windings and a fixed contact electrically connected with said windings, a magnet frame member extending along the magnet assembly, an armature assembly hingedly connected to the frame member and extending over the magnet assembly and having a movable contact cooperable with the fixed contact, spring means normally urging said armature assembly into contact closed position against the force of said magnet, and adjustable anchorage means carried by the frame member and operably connecting the spring means to the magnet frame member, and a temperature responsive means carried by said armature assembly and connected with said spring and adapted to vary the effect of said spring on said armature in response to a predetermined temperature range above a predetermined temperature and to maintain the effect of said spring substantially constant below said temperature.

4. A regulator of the character described comprising; a frame, a magnet carried by said frame, a movable armature hingedly carried by said frame adapted to be attracted by said magnet, a spring means adapted to oppose the movement of said armature by said magnet, a temperature responsive means carried by said armature and connected to said spring and adapted to vary the tension of said spring means in response to temperature changes above a predetermined temperature and responsive to temperature changes below said predetermined temperature to maintain said tension substantially constant below said predetermined temperature.

5. A regulator of the character described, comprising; a frame, a magnet carried by said frame, a movable armature hingedly carried by said frame and adapted to be attracted by said magnet, a spring means adapted to oppose the movement of said armature by said magnet, a temperature responsive means carried by said armature and providing an anchor for an end of said spring and adapted to vary the tension of said spring means in response to ambient temperature changes above a predetermined temperature and responsive to temperature changes below said predetermined temperature to maintain said tension substantially constant below said predetermined temperature and an adjustable means carried by said frame and connected to the other end of said spring for adjusting the tension thereof.

6. The combination set forth in claim 2 wherein, the means connecting the spring with the armature includes a spring hanger of bimetal construction for increasing the spring tension in response to decrease of temperature, and a bimetal compensator engageable with said spring hanger and responsive to decrease of temperature for decreasing the spring tension.

7. The combination set forth in claim 2 wherein, the means connecting the spring with the armature assembly includes a thermo-responsive member for supporting the spring and responding to a rise of temperature to decrease the spring tension and thereby reduce the regulator setting, and a second thermo-responsive member engageable by the first thermo-responsive member at a predetermined temperature and tending to maintain the regulator setting constant below said predetermined temperature.

8. The combination set forth in claim 3 wherein, the anchorage means includes a U-shaped member secured in transverse relation upon the magnet frame member, one flange member of which provides an integral spring arm having a spring seat intermediate its length and an adjusting screw passing through an aperture in the end of said arm and threaded into the opposite flange.

9. The combination set forth in claim 3 wherein, the anchorage means includes an adjustable spring seat secured to the magnet frame member, and a bimetal spring hanger secured to the armature assembly.

10. The combination set forth in claim 3 wherein, the temperature responsive means includes a bimetal spring hanger secured to the armature assembly and having a free end attached to said spring, said spring hanger tending to increase the spring force in response to decrease in temperature and thereby increase the voltage setting.

11. The combination set forth in claim 3 wherein, the temperature responsive means includes a spring hanger tending to increase spring force upon decrease of temperature, and a bimetal compensator operable at a predetermined temperature to engage the spring hanger and thereafter to decrease the spring force with decrease in temperature.

12. The combination set forth in claim 3 wherein, the temperature responsive means includes a bimetal spring hanger attached to the armature assembly and tending to increase contact pressure with decrease in temperature, and a bimetal compensator operable at a predetermined temperature to engage said spring hanger and thereafter oppose the action of said spring hanger.

References Cited in the file of this patent

UNITED STATES PATENTS

| | | |
|---|---|---|
| 1,202,392 | Jepson | Oct. 24, 1916 |
| 1,399,741 | Briggs | Dec. 13, 1921 |
| 1,460,961 | Gilchrist | July 3, 1923 |
| 1,491,355 | May | Apr. 22, 1924 |
| 1,543,927 | Kersten | June 30, 1925 |
| 1,576,768 | Loudon | Mar. 16, 1926 |
| 1,706,042 | Radley | Mar. 19, 1929 |
| 1,724,197 | Hartzell | Aug. 13, 1929 |
| 1,922,422 | Doane | Aug. 15, 1933 |
| 2,037,118 | Chubbuck | Apr. 14, 1936 |
| 2,280,281 | Clayton | Apr. 21, 1942 |
| 2,443,968 | Swing | June 22, 1948 |

FOREIGN PATENTS

| | | |
|---|---|---|
| 85,574 | Sweden | Feb. 18, 1936 |
| 320,681 | Italy | Aug. 31, 1934 |